United States Patent
Alsharif

(10) Patent No.: US 11,050,777 B2
(45) Date of Patent: Jun. 29, 2021

(54) METHOD AND SYSTEM FOR REMEDIATING CYBERSECURITY VULNERABILITIES BASED ON UTILIZATION

(71) Applicant: Saudi Arabian Oil Company, Dhahran (SA)

(72) Inventor: Sultan Saadaldean Alsharif, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 260 days.

(21) Appl. No.: 16/196,771

(22) Filed: Nov. 20, 2018

(65) Prior Publication Data

US 2020/0162499 A1 May 21, 2020

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC .... H04L 63/1433; H04L 63/20; G06F 21/577
See application file for complete search history.

(56) References Cited

U.S. PATENT DOCUMENTS

| | | |
|---|---|---|
| 5,785,856 A | 7/1998 | Gleave et al. |
| 7,487,545 B2 | 2/2009 | Hall et al. |
| 8,918,883 B1 | 12/2014 | Boyle et al. |
| 8,966,640 B1 | 2/2015 | Peddada et al. |
| 8,984,643 B1 | 3/2015 | Crisher et al. |
| 9,544,327 B1 * | 1/2017 | Sharma ................. G06N 20/00 |
| 9,729,569 B2 | 8/2017 | Teilhet et al. |

(Continued)

FOREIGN PATENT DOCUMENTS

| | | |
|---|---|---|
| CN | 101017458 | 8/2007 |
| KR | 101421077 B1 | 7/2014 |
| KR | 101507042 B1 | 4/2015 |

OTHER PUBLICATIONS

Second Written Opinion of the International Preliminary Examining Authority dated May 28, 2020. 19 pages.

(Continued)

*Primary Examiner* — Kevin Bechtel
*Assistant Examiner* — Hamid Talaminaei
(74) *Attorney, Agent, or Firm* — Leason Ellis LLP

(57) ABSTRACT

A technology solution for remediating a cyberattack risk for a web application, including receiving device engagement data for the web application, receiving a security scanning analysis from a static application security testing (SAST) tool that includes a security flaw found in the web application and a severity level for the security flaw, and a plurality of other security flaws found in one or more other web applications and severity levels associated with each of the plurality of other security flaws. The technology solution includes determining a plurality of criticality adjustment values for the security flaw and each of the plurality of other security flaws, applying a criticality adjustment value to the security flaw to modify a severity level for the security flaw, prioritizing the security flaw and the plurality of other security flaws based on the modified severity level to generate prioritized security flaw action items, and mitigating the cyberattack risk for the web application according to the prioritized security flaw action items.

20 Claims, 6 Drawing Sheets

(56) References Cited

U.S. PATENT DOCUMENTS

| | | |
|---|---|---|
| 10,043,004 B2 | 8/2018 | Cornell et al. |
| 10,097,574 B2 | 10/2018 | Tripp et al. |
| 10,587,644 B1 * | 3/2020 | Stolte ..................... H04L 63/20 |
| 10,754,959 B1 * | 8/2020 | Rajasooriya ........ H04L 63/1433 |
| 2013/0074188 A1 * | 3/2013 | Giakouminakis ... H04L 63/1433 |
| | | 726/25 |
| 2014/0283083 A1 | 9/2014 | Gula et al. |
| 2016/0169858 A1 | 6/2016 | Rogel et al. |
| 2017/0026401 A1 | 1/2017 | Poly |
| 2017/0061132 A1 * | 3/2017 | Hovor ................. H04L 63/1433 |
| 2017/0185783 A1 | 6/2017 | Brucker et al. |
| 2018/0164273 A1 | 6/2018 | Sieben et al. |
| 2018/0211047 A1 | 7/2018 | Olson et al. |

OTHER PUBLICATIONS

International Search Report in Corresponding PCT Application No. PCT/USI9/62362 dated Feb. 4, 2020. 11 pages.
International Preliminary Report on Patentability in Corresponding PCT Application No. PCT/US19/62362 dated Sep. 9, 2020. 14 pages.

* cited by examiner

|     | DEFINITIVE | SUSPECT | INFORMATION |
|-----|------------|---------|-------------|
| HIGH | 3,435 | 1,209 | 2,000 |
| MEDIUM | 50,408 | 34,309 | 4,400 |
| LOW | 3,009 | 43,454 | 14,220 |

METHOD AND SYSTEM FOR REMEDIATING CYBERSECURITY VULNERABILITIES BASED ON UTILIZATION

FIELD OF THE DISCLOSURE

The present disclosure relates to a system, a method, and a computer program for detecting, identifying, assessing and remediating security vulnerabilities in a network system, and, more particularly, for detecting, identifying, assessing, and remediating vulnerabilities in computing resources or groups of computing resources in a network system based on computer resource utilization.

BACKGROUND OF THE DISCLOSURE

Network systems are continuously under attack, and applications are frequently targets of those attacks. Therefore, applications are a crucial part when it comes to network security. In efforts to prevent or minimize cyberattacks, it is common practice to employ computer resource scanning and analysis tools to detect vulnerabilities in computing resources, including web applications. These tools are used during the development life cycle of computing resources to detect and remediate vulnerabilities in early stages. The scanning and analysis tools typically generate vulnerability data that can be reviewed and implemented to resolve vulnerabilities in computing resources before the computing resources are made available for release into the production or user environment.

However, in network systems that have thousands, millions, or more, computing resources, such tools tend to identify so many vulnerabilities that it is not possible to remediate all of the identified vulnerabilities in a prescribed time period, or based on available resources such as computing power or skilled personnel. There exists an urgent and unmet need for a technology solution that can efficiently and effectively identify and prioritize vulnerabilities in computing resources for remediation that are critical to the security of a user environment. The present disclosure addresses these and other needs.

SUMMARY OF THE DISCLOSURE

The disclosure provides a novel technology solution, including a method, a system, and a computer program for detecting, identifying and accurately assessing and mitigating vulnerabilities in computing resources. According to an aspect of the disclosure, a method for remediating a cyberattack risk for a web application is provided, the method comprising: receiving device engagement data for the web application; receiving a security scanning analysis from a static application security testing (SAST) tool that includes a security flaw found in the web application and a severity level for the security flaw, and a plurality of other security flaws found in one or more other web applications and severity levels associated with each of the plurality of other security flaws; determining a plurality of criticality adjustment values for the security flaw and each of the plurality of other security flaws; applying a criticality adjustment value to the security flaw to modify a severity level for the security flaw; prioritizing the security flaw and the plurality of other security flaws based on the modified severity level to generate prioritized security flaw action items; and mitigating the cyberattack risk for the web application according to the prioritized security flaw action items. The method can further comprise applying a criticality adjustment value to each of the plurality of other security flaws.

The mitigating the cyberattack risk for the web application can comprise transmitting the security flaw and the security scanning analysis to a client device for review or remediation.

The device engagement data can be received from a Security Information and Event Management (SIEM) system. The device engagement data can be received from a webserver log.

The security scanning analysis can include a security vulnerability matrix comprising a plurality of severity levels.

The plurality of severity levels can include a high-severity level and a low-severity level. The plurality of severity levels can further include a medium-severity level.

The severity level for the security flaw can include a medium-severity level that is modified by the criticality adjustment value to a high-severity level based on the device engagement data for the web application.

The severity level for the security flaw can include a low-severity level that is modified by the criticality adjustment value to a medium-severity level based on the device engagement data for the web application.

The severity level for the security flaw can include a low-severity level that is modified by the criticality adjustment value to a high-severity level based on the device engagement data for the web application.

According to a further aspect of the disclosure, a non-transitory computer readable medium is provided that has stored thereon instructions for remediating a cyberattack risk for a web application comprising machine executable code which, when executed by at least one computing device, causes the at least one computing device to perform steps comprising: receiving device engagement data for the web application; receiving a security scanning analysis from a static application security testing (SAST) tool that includes a security flaw found in the web application and a severity level for the security flaw, and a plurality of other security flaws found in one or more other web applications and severity levels associated with each of the plurality of other security flaws; determining criticality adjustment values for the security flaw and each of the plurality of other security flaws; applying a criticality adjustment value to the security flaw to modify a severity level for the security flaw; prioritizing the security flaw and the plurality of other security flaws based on the modified severity level to generate prioritized security flaw action items; and mitigating the cyberattack risk for the web application according to the prioritized security flaw action items. The step of applying the criticality adjustment value to the security flaw to modify a severity level for the security flaw can comprise: modifying a medium-severity level by the criticality adjustment value to generate a high-severity level based on the device engagement data for the web application; or modifying a low-severity level by the criticality adjustment value to generate a medium-severity level or a high-severity level based on the device engagement data for the web application. The step of applying the criticality adjustment value to the security flaw to modify a severity level for the security flaw can comprise applying a utilization adjustment vulnerability summary matrix.

According to a further aspect of the disclosure, a cyberattack risk remediation system for remediating a security flaw in a web application is provided, the system comprising: a vulnerability determiner that receives a security scanning analysis from a static application security testing (SAST) tool that includes a security flaw found in the web application and a severity level for the security flaw, and a plurality of other security flaws found in one or more other web applications and severity levels associated with each of the plurality of other security flaws; a device engagement determiner that receives device engagement data for the web application, determines a plurality of criticality adjustment values for the security flaw and each of the plurality of other security flaws, applies one of the plurality of criticality adjustment values to the security flaw to modify a severity level for the security flaw, and prioritizes the security flaw and the plurality of other security flaws based on the modified severity level to generate prioritized security flaw action items; and a remediation determiner that mitigates the security flaw in the web application according to the prioritized security flaw action items.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 3 shows an example of a vulnerability summary matrix (VSM) that can be generated and populated with vulnerability summary data by the vulnerability processor in FIG. 2.

Figure 1:
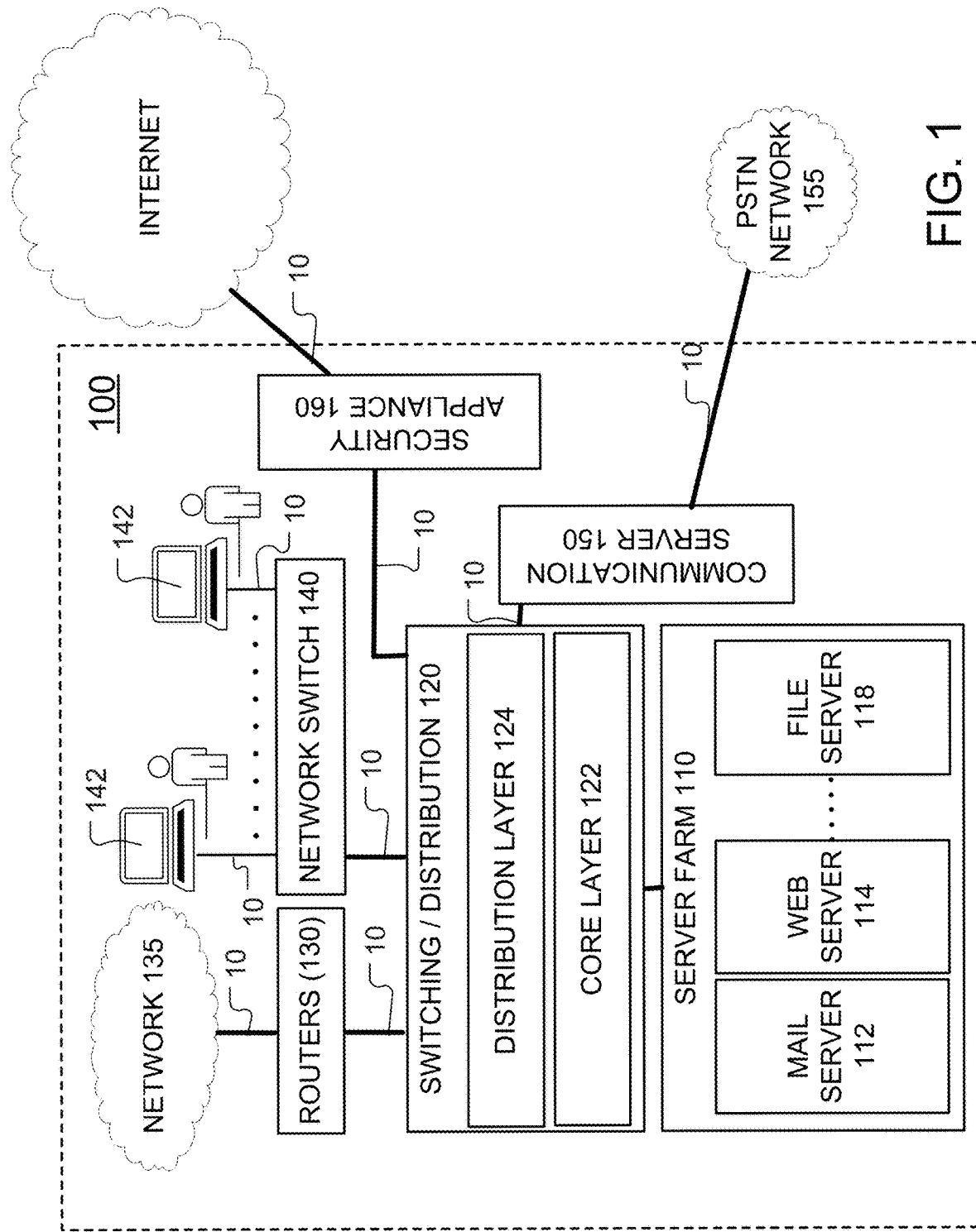
FIG. 1 shows a block diagram of an example of a user environment that is constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

Computing resources, such as, for example, web applications that are open at port number 80 (Hypertext Transfer Protocol (HTTP) used in the World Wide Web (WWW), are exposed to high risks of cyberattacks. Most of these cyberattacks target vulnerabilities in source code in the computing resources. Therefore, an effective way of mitigating such risks is to scan and analyze the source code in the computing resources and remediate any vulnerabilities that might be discovered during the analysis. For user environments that include, for example, enterprise network systems, the instant disclosure provides an efficient and effective technology solution that can assess, prioritize and remediate vulnerabilities in large numbers (e.g., thousands, millions, etc.) of computing resources so that critical vulnerabilities are prioritized for remediation and resolved within a prescribed time, even where resources (e.g., time, computing power, personnel, etc.) are inadequate to resolve all vulnerabilities identified during scanning and analysis of the computing resources.

FIG. 1 shows a non-limiting embodiment of a user environment 100 that is constructed according to the principles of the disclosure. The user environment 100 can comprise an enterprise network system. The user environment 100 comprises a network system that includes a server farm 110, one or more switching and distribution layers 120, one or more routers 130, one or more network switches 140, a communication server 150, and a security server 160, all of which can be interconnected by communication links 10. The user environment 100 can include a firewall that shields it from cyberattacks. The user environment 100 can include one or more computing devices or one or more communicating devices.

The server farm 110 can include a mail server 112, a web server 114, and a file server 118. The communication server 150, which can be located on an intranet, can be located in the server farm 110, or provided as a separate server, as seen in FIG. 1. The intranet can include all of the foregoing computing resource assets and a firewall to protect against threats and breach attempts made against the user environment 100. The server farm 110 can include computing devices, communicating devices or computing resources that are accessible to other computing devices, communicating devices, or computing resources, including, for example, one or more client devices 142. The client device(s) can include a computing device or a communicating device.

The switching and distribution layers 120 can include a core layer 122 and a distribution layer 124. The core layer 122 can include one or more layers of switching devices (not shown) that can connect the server farm 110 to the distribution layer 124. The distribution layer 124 can include one or more layers of switching devices (not shown) that can connect the core layer 122 to the one or more routers 130, the one or more network switches 140, the communication server 150, or the security server 160. The switching and distribution layers 120 can include one or more routers (not shown).

The router(s) 130 can be connected to a network 135 or the Internet by a communication link 10. If a security scanning analysis is generated by a security analyzer (not shown) that is located outside of the network system 100, such as, for example, on a software vendor server (not shown) on the Internet, the security scanning analysis can be received via the router 130, or the communication serer 150, or by the security server 160 via a communication link 10. The network 135 can be located on the intranet, behind a firewall. The router 130 can include a firewall (not shown). The network switch 140 can be connected to one or more client devices 142 by one or more communication links 10. The network switch 140 can include one or more ethernet switches (not shown). Data packets can be securely transported between computing devices or communicating devices in the user environment system 100.

The communication server 150 can include a standards-based computing system that can operate as a carrier-grade common platform for a wide range of communications applications and facilitate communication over, for example, a public switched telephone network (PSTN) 155 or a public land mobile network (PLMN) (not shown). The communication server 150 can include Internet message handling services (MHS) that transfer electronic mail messages between communicating devices in the user environment 100 with communicating devices external to the user environment 100. The MHS can include, for example, a message transfer agent or mail transfer agent (MTA), a mail relay, or the like. The communication server 150 can include a message delivery agent (MDA). The user environment 100 can be connected to the Internet over one or more communication links 10. The user environment 100 can include one or more modems (not shown) configured for one or more cellular network standards, including, but not limited to, for example, GSM, WiMAX, LTE-TDD/TD-LTE, LTE Advanced (E-UTRA), LTE Advanced Pro, HiperMAN, Mobile WiMAX, Flash-OFDM, iBurst, CDMA2000, HSPA, UMTS, WiDEN, GPRS, CDPD, D-AMPS, NMT, AMPS, or the like, or any other modulating/demodulating device that can facilitate transmission of short message services (SMS) messages, or the like, over the PSTN 155, the PLMN (not shown), or the like.

The security server 160 can include hardware, firmware, or software that provides security analysis and vulnerability detection and identification, malware protection, application visibility and control, reporting, secure mobility, and protection against threats that can arise during connection to computing devices or communicating devices or the Internet. The security server 160 can include a firewall. The security server 160 can include one or more security analyzers (not shown) that can detect, identify and assess vulnerabilities across many disparate hardware, firmware or software platforms. The security analyzers (not shown) can include, for example, Static Application Security Testing (SAST) tools, Dynamic Application Security Testing (DAST) tools, Software Composition Analysis (SCA) tools, Database Security Scanning (DSS) tools, Mobile Application Security Testing (MAST) tools, Interactive Application Security Testing (IAST) tools, Application Security Testing as a Service (ASTaaS) tools, Correlation tools, Test Coverage Analyzer tools, Application Security Testing Orchestration (ASTO) tools, Taint Analysis tools, Data Flow Analysis, tools, logging and monitoring tools, log management tools, among many other tools that can scan and analyze computing resources and detect, identify and assess vulnerabilities in those computing resources, as well as device engagement with those computing resources. To prevent compromises of computing resources, the security server 160 can implement remediation to resolve vulnerabilities, including, for example, applying patches or fixes to source code in the computing resources.

The security scanning analysis can be generated by a security analyzer and can include one or more security scan results for each vulnerability (or security flaw) detected in a computing resource such as, for example, a web application. The security scan results can be analyzed by the security server 160, or a security analyst via a client device 142 in communication with the security server 160, to identify, assess, or apply remediation to the vulnerabilities in the computing resources.

Figure 2:
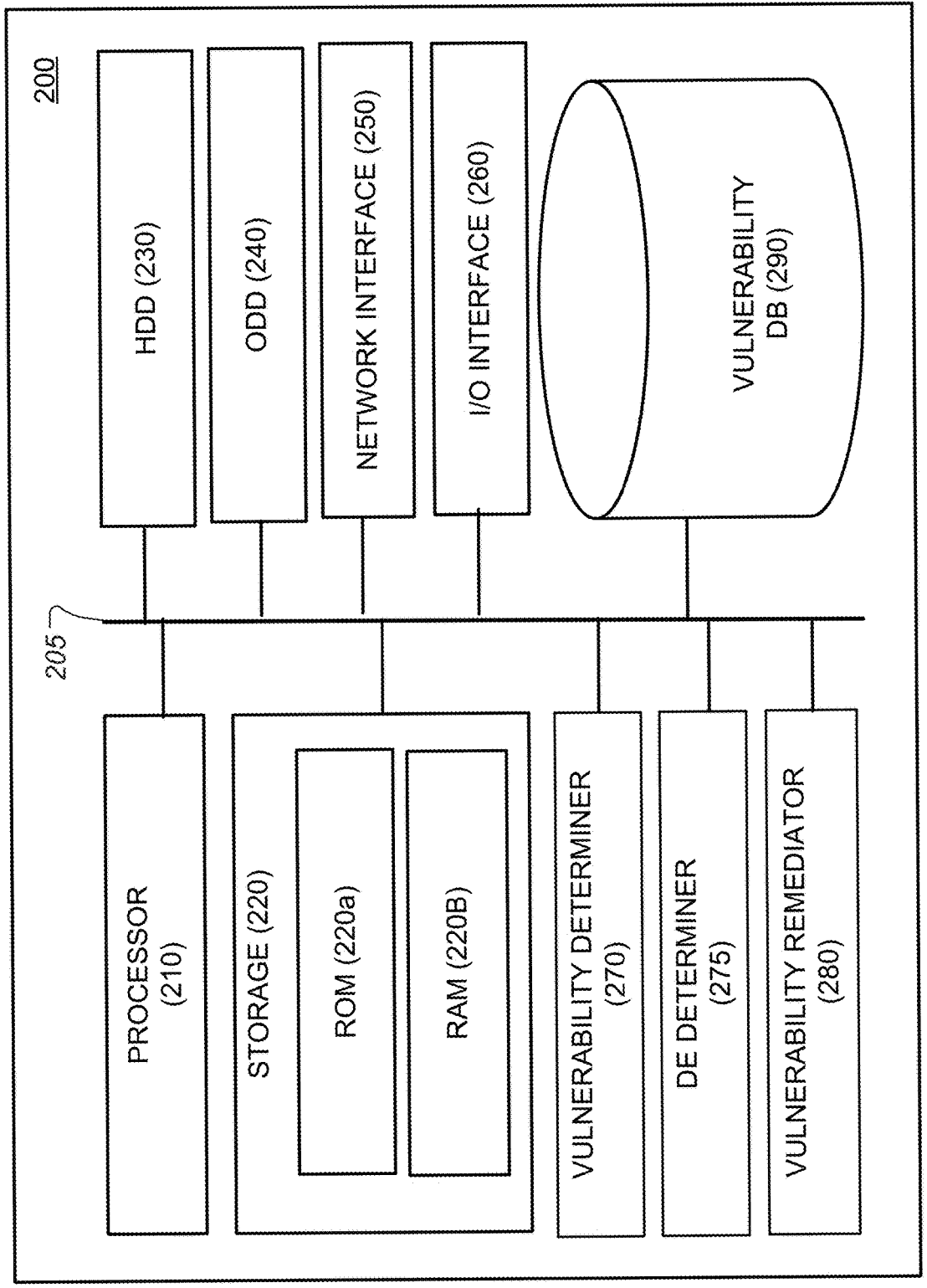
FIG. 2 shows an example of a vulnerability processor that can be included in a security server in the user environment shown in FIG. 1.

FIG. 2 shows a non-limiting example of a vulnerability processor 200 that is constructed according to the principles of the disclosure. The vulnerability processor 200 can be included in the security server 160 (shown in FIG. 1). The vulnerability processor 200 can be configured to implement the various aspects of the disclosure. The vulnerability processor 200 includes a processor 210, a storage 220, a hard disk drive (HDD) 230, an optical disk drive (ODD) 240, a network interface 250, an input/output (I/O) interface 260, a vulnerability determiner 270, a device engagement (DE) determiner 275, a vulnerability remediator 280, a vulnerability database 290, and a system bus 205 that can be communicatively linked to each of the components in the vulnerability processor 200 by a communication link.

The system bus 205 can be any of several types of bus structures that can further interconnect to a memory bus (with or without a memory controller), a peripheral bus, and a local bus using any of a variety of commercially available bus architectures.

The processor 210 can be any of various commercially available processors. Dual microprocessors and other multi-processor architectures can also be employed as the processor.

The vulnerability processor 200 includes a computer-readable medium that can hold executable or interpretable computer code (or instructions) that, when executed by one or more computing devices (e.g., in the processor 210), causes the steps, processes and methods described herein to be carried out. The computer-readable medium can be contained in the storage 220, HDD 230, or ODD 240 and accessed by the processor 210. The computer readable medium can include sections of computer code that, when executed by one or more computing devices (e.g., in the processor 210, vulnerability determiner 270, DE determiner 270, or vulnerability remediator 280), cause the vulnerability processor 200 to carry a process 600 shown in FIG. 6, as well as all other process steps described or contemplated herein.

The storage 220 includes a read only memory (ROM) 220A and a random-access memory (RAM) 220B. The storage 220 can store security scanning analysis data, device engagement data, vulnerability data and computing resource data. A basic input/output system (BIOS) can be stored in the non-volatile memory 220A, which can include, for example, a ROM, an EPROM, an EEPROM, or the like. The BIOS can contain the basic routines that help to transfer information between components within the processing unit 200, such as during start-up. The RAM 220B can include a high-speed RAM such as static RAM for caching data.

The HDD 230 can include, for example, an enhanced integrated drive electronics (EIDE) drive, a serial advanced technology attachments (SATA) drive, or the like; and, the ODD 240 can read/write from/to a CD-ROM disk (not shown), or, read from or write to other high capacity optical media such as the DVD. The HDD 230 can be configured for external use in a suitable chassis (not shown). The HDD 230 and ODD 240 can be connected to the system bus 205 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 230 and/or ODD 240, and their associated computer-readable media, can provide nonvolatile storage of data, data structures, computer-executable instructions, and the like. The HDD 230 and/or ODD 240 can accommodate the storage of any data in a suitable digital format. The storage 220, HDD 230, and/or ODD 240 can include one or more apps that are used to execute aspects of the architecture described herein.

A number of program modules can be stored in the HDD 230, ODD 240, and/or RAM 220B, including an operating system (not shown), one or more application programs (not shown), other program modules (not shown), and program data (not shown). Any (or all) of the operating system, application programs, program modules, and program data can be cached in the RAM 220B as executable sections of computer code.

The network interface 250 can be connected to the network 135 or the Internet (shown in FIG. 1). The network interface 250 can include a wired or a wireless communication network interface (not shown) and/or a modem (not shown). When used in a local area network (LAN), the vulnerability processor 200 can be connected to the LAN network (e.g., network 135, shown in FIG. 1) through the wired and/or wireless communication network interface; and, when used in a wide area network (WAN), the vulnerability processor 200 can be connected to the WAN network through the modem. The network 135 (shown in FIG. 1) can include a LAN, a WAN, or the like. The modem (not shown) can be internal or external and wired or wireless. The modem can be connected to the system bus 205 via, for example, a serial port interface (not shown). The modem can be located in the communication server 150 (shown in FIG. 1).

The (I/O) interface 260 can receive commands and data from an operator via the I/O interface, which can be communicatively coupled to one or more input/output devices (not shown), including, for example, a keyboard, a mouse, a pointer, a microphone, a speaker, a display, and the like. The received commands and data can be forward to the processor 210 from the I/O interface 260 as instruction and data signals via the bus 205.

The vulnerability determiner 270 can be a device or a module that is separate from the processor 210, as seen in FIG. 2, or it can be integrated with the processor 210. The vulnerability determiner 270 can be connected to the system bus 205 and configured to receive at an input (not shown) a security scanning analysis from a security analyzer (not shown). The vulnerability determiner 270 can include one or more security analyzers (not shown). The vulnerability determiner 270 can receive a security scanning analysis, such as, for example, from a security analyzer located in the user environment 100, or external to the user environment 100, such as, for example, at a software provider site on the Internet. The vulnerability determiner 270 can analyze each vulnerabilities in the security scanning analysis and sort the vulnerabilities according to, for example, the Open Web Application Security Project (OWASP) top 10 vulnerabilities in web applications criteria, which, as of the date of this writing, includes (A1) injection, (A2) broken authentication, (A3) sensitive data exposure, (A4) XML external entities (XXE), (A5) broken access control, (A6) security misconfiguration, (A7) cross-site scripting (XSS), (A8) insecure deserialization, (A9) using components with known vulnerabilities, and (A10) insufficient logging and monitoring. An OWASP listing of criteria can be found at, for example, <www.owasp.org>, including a brief description and explanation of each criteria. After analyzing and sorting the vulnerabilities, the vulnerability determiner 270 can generate vulnerability summary matrix data, which can be output to the device engagement (DE) determiner 280 or the vulnerability database 290. The vulnerability determiner 270 can output the vulnerability summary matrix data as a vulnerability summary matrix 300, with each field in the matrix 300 populated with associated vulnerability summary data. The vulnerability summary matrix can include one or more columns, one or more rows, and can include two or more dimensions.

FIG. 3 shows an example of a vulnerability summary matrix (VSM) 300 that can be generated or populated with vulnerability summary data, according to the principles of the disclosure. The vulnerability summary data can include a summary of the vulnerability findings identified by the security analyzer(s), which can be presented in a tabular format such as, for example, a heat map. As seen in FIG. 3, the VSM 300 includes a two-dimensional three-by-three (3×3) matrix that includes nine discrete fields that are populated with the numbers of vulnerabilities determined for each of the fields.

In the example in FIG. 3, the VSM 300 is a two-dimensional 3×3 matrix that has three columns that can be populated with the number of vulnerabilities that are determined to be DEFINITIVE, SUSPECT, or INFORMATION. The VSM 300 has three rows that include severity levels for the vulnerabilities in each column, including HIGH, MEDIUM, and LOW. Each of the fields indexed by a column and row can be populated with the number of vulnerabilities determined to be associated with the column category (e.g., DEFINITIVE, SUSPECT, or INFORMATION) for that column and severity level (e.g., HIGH, MEDIUM, or LOW) for that row. HIGH, MEDIUM, and LOW can correspond to high-severity vulnerabilities, medium-severity vulnerabilities, and low-severity vulnerabilities, respectively. As seen, the vulnerability summary matrix data in the VSM 300 can include, for example, 3,435 vulnerabilities out of 156,444 vulnerabilities in the analysis set that have been determined to be DEFINITIVE (actual vulnerabilities) and HIGH (high-severity vulnerabilities), thereby being identified as the most urgent and critical to remediate. These vulnerabilities can be prioritized for the earliest remediation since they have the highest risk of exploitation, compared to the other vulnerabilities in the vulnerability summary matrix data. When prioritizing analysis and remediation of the vulnerabilities, the vulnerabilities identified in the left-upper-most fields in the VSM 300 should be assigned the highest priority (i.e., before the other fields in the VSM 300) for review or remediation, with the prioritization diminishing for the vulnerabilities in the fields that are further removed from the DEFINITIVE-HIGH field. The vulnerabilities identified in the VSM 300 can be prioritized such that vulnerabilities in the darker fields in the VSM 300 are mitigated (i.e., reviewed or remediated) before the vulnerabilities in the lighter fields in the VSM 300.

The severity levels (HIGH, MEDIUM, LOW) in the VSM 300 can facilitate prioritization of vulnerabilities for review or remediation based on risks associated with the vulnerabilities. However, this approach alone may not provide satisfactory results under real-world conditions and can generate ambiguous results that do not reflect the true risks associated with vulnerabilities in computing resources. This disadvantage can result in erroneous prioritization and remediation of non-critical or less critical vulnerabilities at the expense of forgoing remediation of truly critical vulnerabilities in computing resources where resources such as time or computing power or personnel might be restricted. For example, this can happen where a truly critical DEFINITIVE vulnerability is determined to have a MEDIUM severity level and is not remediated because many other vulnerabilities are determined to have a HIGH severity level and there are insufficient resources to address all vulnerabilities having the MEDIUM severity level during an allotted time period. The erroneous prioritization and remediation can leave critical vulnerabilities in place, thereby exposing the user environment to a heightened risk of successful cyberattacks that can potentially severely impact or take down the user environment. The technology solution disclosed herein addresses the foregoing shortcomings by, among other things, assessing and employing device engagement levels for each computing resource to prioritize vulnerabilities for review or remediation based on device engagement of the associated computing resource(s).

The device engagement (DE) determiner 275 can be a device or a module that is separate from the processor 210, as seen in FIG. 2, or it can be integrated with the processor 210. The DE determiner 275 can be connected to the system bus 205 and configured to receive device engagement data for each computing resource at one or more inputs (not shown) from, for example, web server logs (e.g., from web server 114, shown in FIG. 1, or the vulnerability database 290, shown in FIG. 2), a Security Information and Event Management (SIEM) system (not shown) (e.g., located in the security server 160, shown in FIG. 1), or the like, and determine a computing resource utilization adjustment (CRUA) for each computing resource.

The device engagement data can include information about device engagement for each computing resource, including for example, the number of times a computing resource is accessed, interacted with, or contacted by a computing device or a communicating device during a period of time (e.g., the number of visits to a web application), the specific times the device engagements occurred, and the duration of each device engagement (e.g., the time spent on each web application). The device engagement data can include information about the port number (e.g., port 80) used during each device engagement, the IP address of each computing or communicating device that accessed, interacted with, or contacted the computing resource, the amount of data (e.g., in bytes, kilobytes, megabytes, etc.) transferred during each device engagement, and the like.

The DE determiner 275 can include one or more inputs (not shown) that receive vulnerability data from the vulnerability determiner 270 or a security analyzer (not shown) located in the user environment 100 or external to the user environment 100. The DE determiner 275 can receive vulnerability data at the one or more inputs from the vulnerability database 290 (shown in FIG. 2). The DE determiner 275 can receive associated vulnerability summary matrix data from the vulnerability determiner 270 or the vulnerability database 290.

The DE determiner 275 can receive device engagement data for each computing resource, and, based on the received device engagement data, the DE determiner 275 can determine a computing resource utilization adjustment (CRUA) matrix CRUA and apply the matrix CRUA to each vulnerability in a grouping of vulnerabilities associated with an analysis set of x computing resources that were scanned and analyzed and for which vulnerability data was received or determined, where x is a positive non-zero integer. The CRUA matrix CRUA can include a multidimensional matrix, including, for example, a two-dimensional a×b matrix, where a and b are positive non-zero integers that can have the same or different values.

Figure 4:
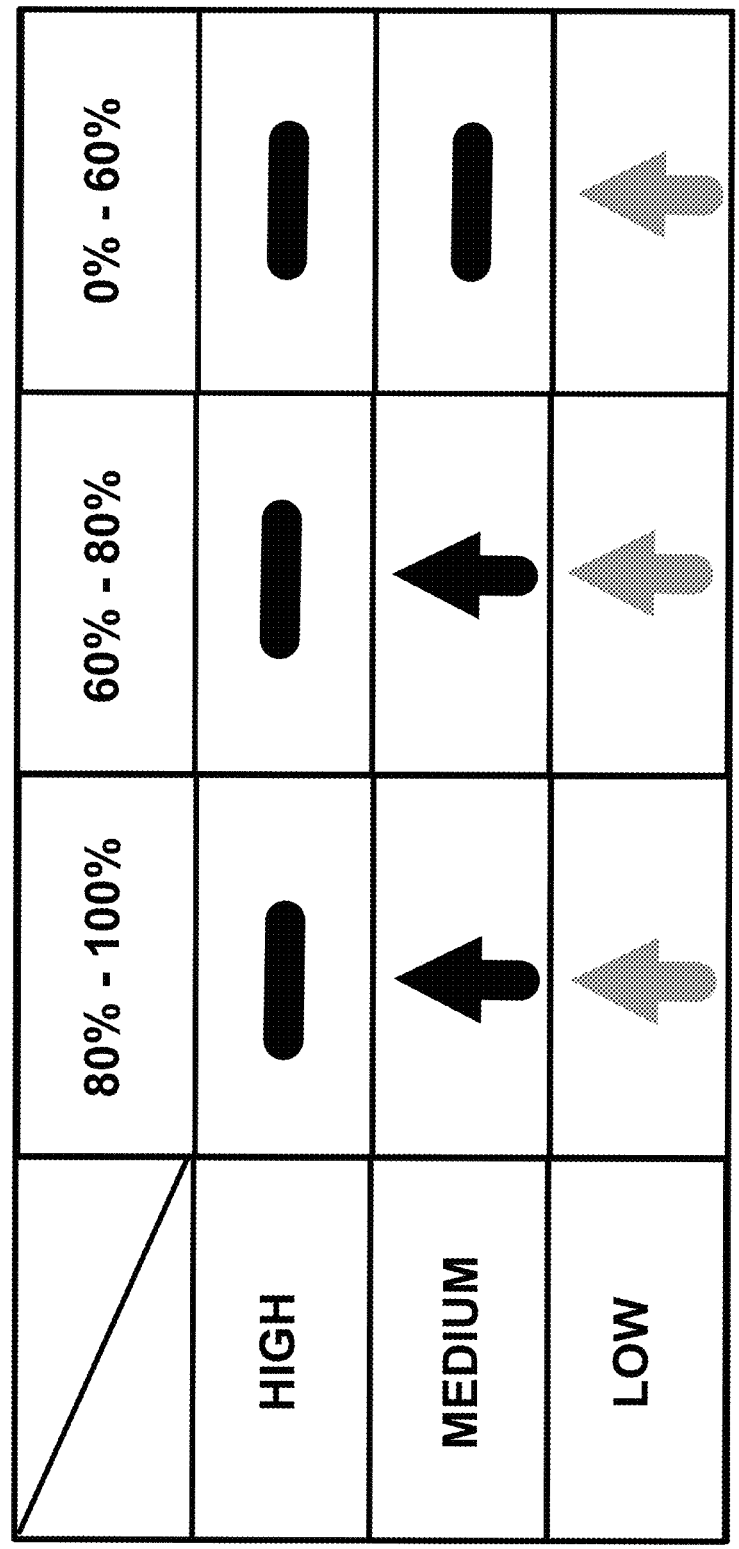
FIG. 4 shows an example of a computing resource utilization adjustment (CRUA) matrix that can be generated and populated with CRUA data by the vulnerability processor in FIG. 2.

FIG. 4 shows an example of a CRUA matrix 400 that can be generated or populated by the DE determiner 275. THE CRUA matrix 400 includes a 3×3 matrix having a plurality of criticality adjustment (CA) values $A_x$, $A_y$, $A_z$, $B_x$, $B_y$, $B_z$, $C_x$, $C_y$, and $C_z$, which, in the example in FIG. 4, are set to 0, 0, 0, 1, 1, 0, 1, 1, 1, respectively.

$$CRUA = \begin{vmatrix} A_x & A_y & A_z \\ B_x & B_y & B_z \\ C_x & C_y & C_z \end{vmatrix} \quad CRUA(\text{FIG. } 4) = \begin{vmatrix} 0 & 0 & 0 \\ 1 & 1 & 0 \\ 1 & 1 & 1 \end{vmatrix}$$

While the CRUA matrix CRUA can have criticality adjustment CA values segmented into any number of columns or rows, the CRUA matrix 400 (shown in FIG. 4) is segmented into three separate percentile groups, including a top percentile group (e.g., 80% to 100%), a middle percentile group (e.g., 60% to 80%) and a lowest percentile group (e.g., 0% to 60%). The rows in the CRUA matrix 400 include three severity levels for each of the percentile groups, including, HIGH, MEDIUM, and LOW, with HIGH being associated with those vulnerabilities that are likely to have the greatest impact on the user environment 100. These vulnerabilities have the highest risk of exploitation, compared to the other vulnerabilities that may be determined to have MEDIUM or LOW severity level. The criticality adjustment CA values can be segmented into fewer than three percentile groups, or more than four percentile groups. The criticality adjustment CA values can be segmented into fewer than three severity levels (e.g., HIGH and LOW), or more than three severity levels (e.g., HIGH, HIGH-MEDIUM, MEDIUM, MEDIUM-LOW, LOW).

According to a non-limiting example of the disclosure, the criticality adjustment CA values in the CRUA matrix CRUA can include, for example, "0", "1", or "2". In this example, "0" can be assigned to computing resources determined to have a device engagement value $DE_i$ below a lowest percentile device engagement threshold ($DE_{T-LOW}$), in the lowest percentile (e.g., 0% to 60%) of device engagement in the set of x computing resources, where i is a positive non-zero integer. "1" can be assigned to computing resources determined to have a device engagement value $DE_i$ between the bottom percentile device engagement threshold ($DE_{T-LOWEST}$) and the top percentile device engagement threshold ($DE_{T-TOP}$), in the middle percentile (e.g., 60% to 80%) of device engagement; and, "2" can be assigned to computing resources determined to have a device engagement value $DE_i$ above the top percentile device engagement threshold ($DE_{T-TOP}$), in the top percentile (e.g., 80% to 100%) of device engagement. In this illustrative example, $DE_{T-LOWEST}$ is equal to 60% and $DE_{T-TOP}$ is equal to 80%. The criticality adjustment CA values can include more than three discrete values (or levels, or less than three discrete values (or levels). Also, percentile device engagement thresholds $DE_T$ can include one threshold value or more than two threshold values. Based on the percentile device engagement thresholds $DE_T$ and the device engagement values DE, the DE determiner 275 can determine the criticality adjustment CA values for the CRUA matrix CRUA for the vulnerabilities in the analysis set of x computing resources.

Alternatively, the criticality adjustment CA values in the CRUA matrix CRUA can be determined by, instead, comparing a pro rata device engagement value $DE_{PRi}$ for the computing resource i to the pro rata device engagement values $DE_{PR}$ of the remaining x−1 computing resources in the analysis set and sorting the computing resources in priority from, for example, highest pro rata device engagement value to lowest pro rata device engagement value, and assigning a criticality adjustment CA value (e.g., "0", "1", or "2") to the fields in the CRUA matrix CRUA based on the pro rata device engagement value $DE_{PRi}$ compared to, for example, a mean of, or a standard deviation for of all of the device engagement values $DE_{PR1}$ ... $DE_{PRx}$.

The device engagement thresholds ($DE_T$) can be included in the device engagement data received by the DE determiner 275, or determined by the DE determiner 275. The device engagement thresholds ($DE_T$) can be determined based on, for example, the distribution of the pro rata device engagement values $DE_{PR}$ for the x computing resources. For example, a bell curve can be used to identify the bottom percentile device engagement threshold $DE_{T-LOWEST}$ and the top percentile device engagement threshold $DE_{T-TOP}$. Based on the received device engagement data, the DE determiner 275 can determine a device engagement value ($DE_i$) for each computing resource i based on, for example, the amount, duration, or type of device engagement for each computing resource.

According to a non-limiting example of the disclosure, the DE determiner 275 can determine the device engagement value $DE_i$ based on one or more of the following: a frequency (f) of device engagements, such as, for example, the number of times a computing resource is accessed, interacted with, or contacted; a time duration (t) of device engagements, such as, for example, the duration of each device engagement, or an average duration of device engagements during a period of time for a computing resource; a number of unique visitors (v) to a computing resource, such as, for example, the total number devices having unique IP addresses that interacted with web application during a period of time; a number of repeat visitors (u) to a computing resource, such as, for example, the total number of devices having unique IP addresses that visited a web application above a predetermined number of times (e.g., 2 times, 3 times, etc.); and, the amount of data transferred (d) to or from the computing resource, such as, for example, the total amount of data transferred during each device engagement with a web application, or the average amount of data transferred during device engagements with a web application over a period of time. It is noted that additional aspects of device engagements can be factored in determining the device engagement value $DE_i$.

The device engagement value $DE_i$ can be used to determine a pro rata device engagement value $DE_{PRi}$ for each computing resource i in the analysis set of x computing resources by, for example, dividing the device engagement value $DE_i$ for the computing resource i by a sum of the device engagement values $DE_1$ ... $DE_x$ for the x computing resources in the analysis set. The following equation illustrates an example of the relationship:

$$DE_{PRi}(f, t, v, u, d) = \frac{DE_i(f, t, v, u, d)}{\sum_{i=1}^{x} DE(f, t, v, u, d)}$$

Although the pro rata device engagement value $DE_{PRi}$ is shown as being determined as a function of frequency of device engagements f, device engagement duration time t, number of unique visitors v, number of repeat visitors u, and the amount of data transferred d, the determination can be made, as noted earlier, based on fewer than all of these variables, such as, for example, only one of the variables (e.g., frequency of device engagements f).

Once the device engagement values $DE_1$ to $DE_x$ have been determined for the analysis set of x computing resources, the DE determiner 275 can determine the mean, mode, median, or standard deviation values for the device engagement values in the set. The DE determiner 275 can implement the determined mean value, mode value, median value, the standard deviation value, pro rata device engagement values $DE_{PR1}$ to $DE_{PRx}$ or device engagement values $DE_1$ to $DE_x$ for the analysis set of x computing resources to determine the percentile device engagement thresholds $DE_T$. For instance, using a bell curve for the distribution of the device engagement values $DE_1$ to $DE_x$, the DE determiner 275 can set the percentile device engagement thresholds $DE_T$ to the top and bottom fifteen percentile (15%). The device engagement thresholds $DE_T$ can be determined or modified based on additional variables, such as, for example, the resources available for review or remediation of the vulnerabilities, including, for example, computing power, available time period for review or remediation, available security analyst or developer man-hours, or the like.

The vulnerabilities for the x computing resources can be prioritized or ranked based on their respective device engagement values $DE_i$ or pro rata device engagement values $DE_{PRi}$. For example, the DE determiner 275 can prioritize vulnerabilities for each of the x computing resources from highest device engagement value DE or pro rata device engagement value $DE_{PR}$ to lowest device engagement value or pro rata device engagement value.

Referring to FIG. 3, the vulnerability summary data in the vulnerability summary matrix (VSM) 300 can be modified by the criticality adjustment CA values in the CRUA matrix 400 (shown in FIG. 4). In this example, the criticality adjustment CA values were determined by the DE determiner 275 for vulnerabilities in the vulnerability summary data in the VSM 300. The DE determiner 275 can analyze the vulnerabilities in the VSM 300 and apply criticality adjustment CA values in the CRUA matrix CRUA to the vulnerabilities to generate a utilization adjusted vulnerability summary matrix (UAVSM).

Figure 5:
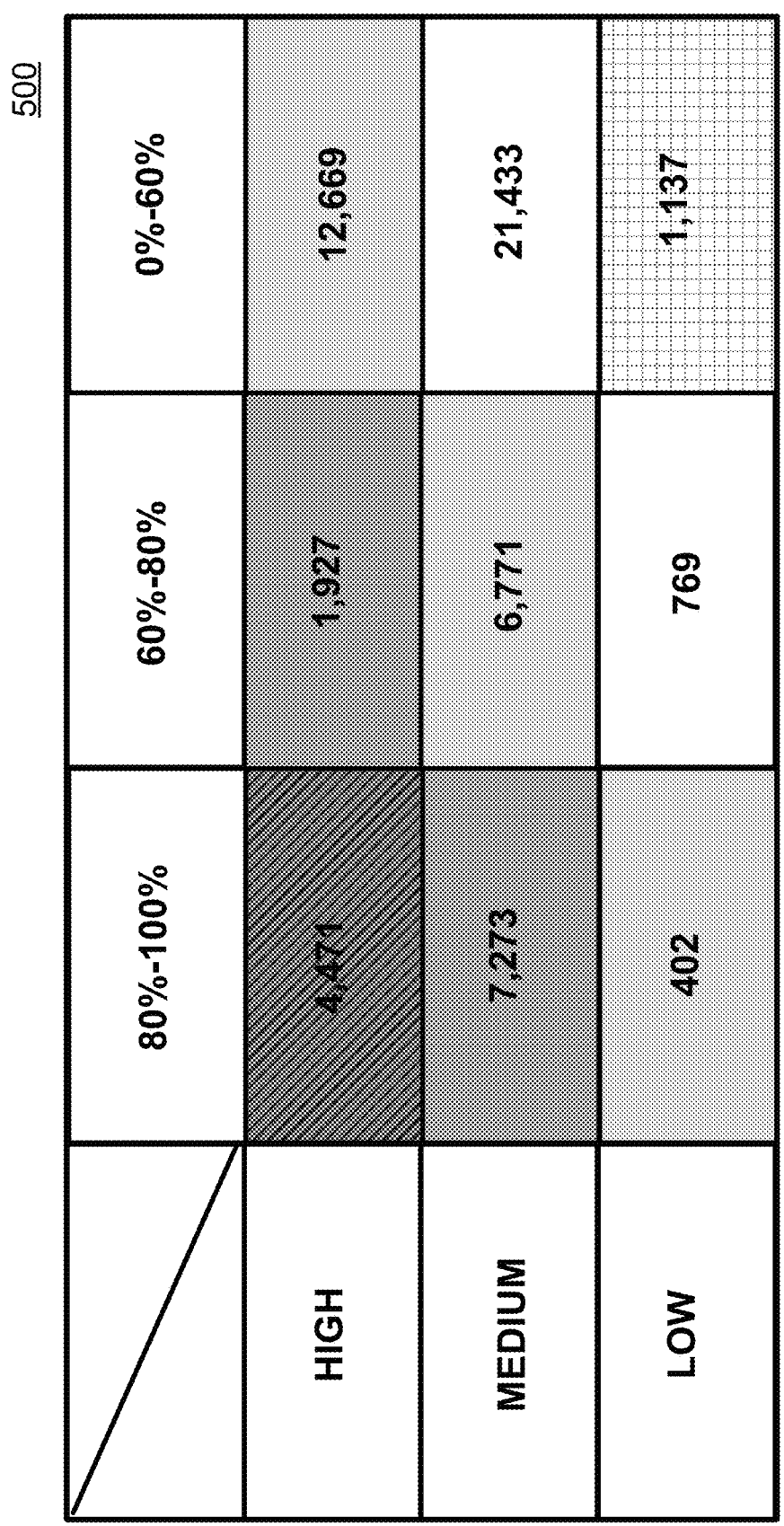
FIG. 5 shows an example of a utilization adjusted vulnerability summary matrix (UAVSM) that can be generated and populated with UAVSM data by the vulnerability processor in FIG. 2.

FIG. 5 shows an example of a utilization adjusted vulnerability summary matrix (UAVSM) 500 that can be generated or populated by the DE determiner 275 by, for example, applying the CRUA matrix 400 (shown in FIG. 4) to the DEFINITIVE-MEDIUM and DEFINITIVE-LOW fields in the VSM 300 (shown in FIG. 3), which total 53,417 vulnerabilities in this example. As seen, the 53,417 vulnerabilities in the DEFINITIVE-MEDIUM and DEFINITIVE-LOW fields in the VSM 300 are reprioritized and sorted based on the percentile of device engagements (e.g., columns in UAVSM 500 in FIG. 5) and the criticality values (e.g., rows in UAVSM 500 in FIG. 5), with the most urgent or critical vulnerabilities located in the left-upper-most fields and least urgent or critical vulnerabilities located in the right-bottom-most fields.

The vulnerability remediator 280 can be a device or a module that is separate from the processor 210, as seen in FIG. 2, or it can be integrated with the processor 210. The vulnerability remediator 280 can be connected to the system bus 205 and configured to receive utilization adjusted vulnerability summary matrix UAVSM data at one or more inputs (not shown). The vulnerability remediator 280 can be configured to receive vulnerability data for each computing resource associated with the UAVSM data. The vulnerability data can be received from one or more security analyzers (not shown) or the vulnerability database 290. The vulnerability remediator 280 can mitigate (i.e., review or remediate) vulnerabilities identified in the received vulnerability data and UAVSM data, based on the UAVSM data. The vulnerability remediator 280 can transmit the vulnerability data and UAVSM data to, for example, a client device 142 (shown in FIG. 1), where the vulnerabilities can be reviewed and remediated based on the UAVSM data. The vulnerability remediator 280 can remediate the vulnerabilities by implementing patches or fixes to the source code in the computing resources associated with the vulnerabilities.

The vulnerability database 290 can store vulnerability data and device engagement data for one or more computing resources in the user environment 100. The database 290 can store security scanning analysis data, web server log data, and web application log data for the one or more computing resources. The vulnerability database 290 can store device engagement data (including, e.g., frequency f, time duration t, number of unique visitors v, number of repeat visitors u, amount of data transferred d), CRUA data, VSM data, UAVSM data, criticality adjustment CA data, pro rata device engagement value $DE_{PR}$ data, percentile device engagement threshold $DE_T$ data, and device engagement value DE data. The vulnerability database 290 can be accessed by the vulnerability determiner 270 or DE determiner 275 or vulnerability remediator 280, as well as other computing devices or communicating devices, such as, for example, the client device 142 (shown in FIG. 1). The vulnerability database 290 can receive queries and, in response, retrieve specific records or portions of records based on the queries. The vulnerability database 290 can include a database management system (DBMS) that can interact with the vulnerability determiner 270, DE determiner 275, vulnerability remediator 280, or computing devices in the vulnerability processor 200. The DBMS can interact with computing devices or communicating devices outside of the vulnerability processor 200. The vulnerability database 290 can include a relational database.

Figure 6:
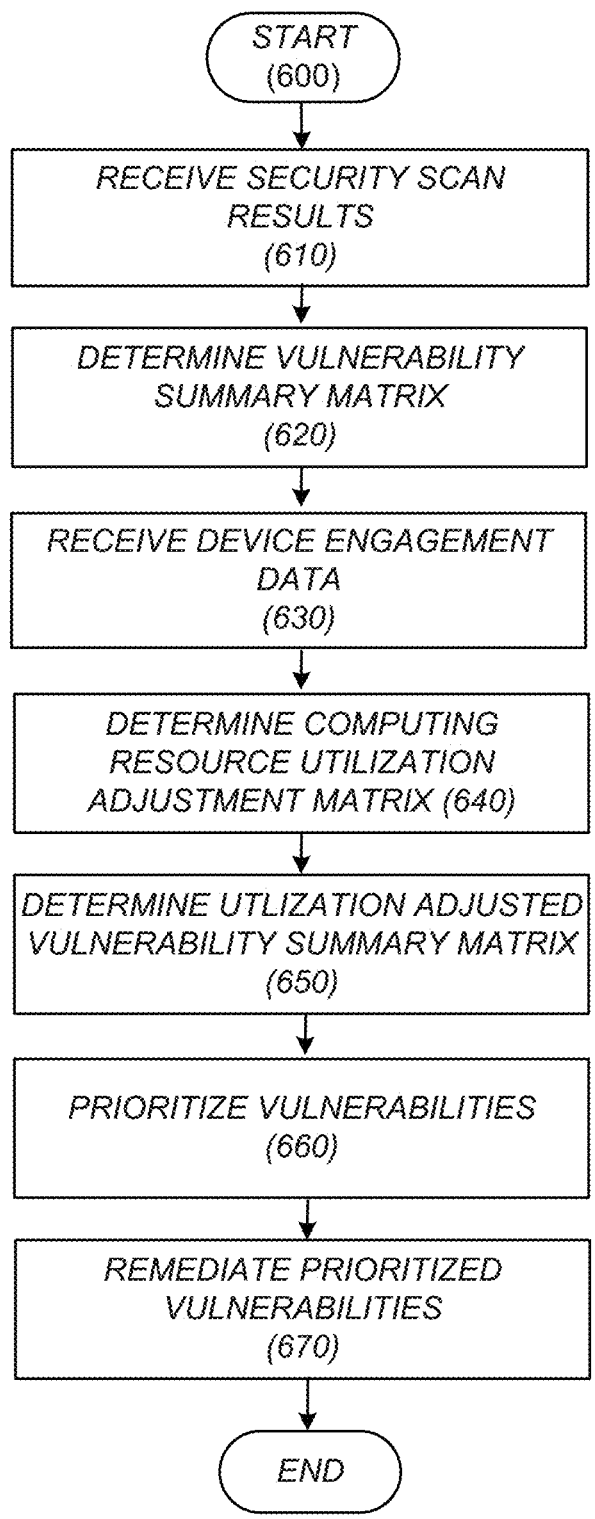
FIG. 6 shows an example of a vulnerary process that can be carried in the user environment in FIG. 1.

FIG. 6 shows an example of a vulnerary process 600, according to the principles of the disclosure. The process 600 can be carried out by the security server 160 (shown in FIG. 1). The security server 160 can include or can access a computer readable medium that contains a computer program, which, when executed on one or more computing devices, cause the vulnerary process 600 to be carried out. The computer program can be tangibly embodied in the computer readable medium, comprising one or more program instructions, code segments, or code sections for performing each of the steps in the process 600 shown in FIG. 6, when executed by the one or more computing devices.

Referring to FIGS. 2 and 6, security scan results for a computing resource can be received in the form of security scan results data packets by the vulnerability determiner 270 (shown in FIG. 2) from a security analyzer (not shown) or the vulnerability database 290 (shown in FIG. 2) (Step 610). The security scan results can include vulnerability data generated based on an analysis carried out throughout an implementation phase of a Secure Software Development Lifecycle (SSDLC) and conducted using vulnerability assessment tools that can highlight possible vulnerabilities within "static" (non-running) source code by employing techniques such as Taint Analysis, Data Flow Analysis, or the like. The vulnerabilities in the source code can be identified by security analyzers such as, for example, Static Application Security Testing (SAST) tools that can scan and analyze source code in one or more computing resources (such as, for example, web applications) and generate vulnerability data that identifies each of the vulnerabilities detected in the analyzed source code. The vulnerability data can be parsed from the security scan results data packets and forwarded to the vulnerability determiner 270 over the bus 205 (shown in FIG. 2).

The vulnerability determiner 270 can analyze, classify and prioritize the vulnerabilities in the received vulnerability data and generate a vulnerability summary matrix (Step 620). Alternatively, the vulnerability summary matrix can be received from a security scanning tool (not shown). FIG. 3 shows an example of a VSM 300 that can be generated by the vulnerability determiner 270. As seen in FIG. 3, the VSM 300 can include, but is not limited to, a three-by-three matrix populated with security findings data for a set of x computing resources for which vulnerability data was received. The columns can include a DEFINITIVE column that includes the number of vulnerabilities in the analysis set of x computing resources that have been determined as actual vulnerabilities, and a SUSPECT column that includes the number of vulnerabilities in the analysis set that are suspected of being actual vulnerabilities. The VSM 300 can include an INFORMATION column that includes the number of potential vulnerabilities, but where additional information might be required. The INFORMATION column can include, for example, information about the total number potential vulnerabilities scanned and analyzed in the analysis set of x computing resources.

As seen in FIG. 3, the VSM 300 can include three rows comprising three severity levels, including HIGH, MEDIUM and LOW rows. The HIGH, MEDIUM, and LOW rows can include the numbers of vulnerabilities determined to be high-severity, medium-severity, and low-severity vulnerabilities, respectively. High-severity vulnerabilities can include, for example, security flaws that can be exploited to take complete control over the computing resource without having direct access to the computing resource; medium-severity vulnerabilities can include, for example, security flaws that can be exploited to access data and modify it so that it cannot be used as intended; and, low-severity vulnerabilities can include, for example, security flaws that cannot be exploited over a network and require authorized access or direct user interaction. Each of the fields in the VSM 300 (e.g., nine fields in this example) can be populated with the numbers of vulnerabilities determined to be DEFINITIVE, SUSPECT, and INFORMATION, and each of the vulnerabilities in these categories can be further broken down based on severity level, as seen in FIG. 3. The VSM 300 can be displayed on a display in, for example, the client device 142 (shown in FIG. 1). Each of the fields in the VSM 300 can include a link that, if selected (e.g., double-click), can retrieve and display the related vulnerability data for the field.

The vulnerability determiner 270 can populate the fields in the VSM 300 based on, for example, the 2018 OWASP Top 10 most critical web applications security risks, or another compliance-oriented scheme that might be readily available.

After the security scan results are received (Step 610), the DE determiner 275 (shown in FIG. 2) can receive device engagement data corresponding to the received vulnerability data from web server logs, a SIEM system, the vulnerability database 290 (shown in FIG. 2), or the like (Step 630). The device engagement data can include information about device engagement for each of the x computing resources in the analysis set. For example, the device engagement data can include the number of times a computing resource is accessed, interacted with, or contacted by a computing device or a communicating device during a period of time (e.g., the number of visits to a web application), the specific times at which the device engagements occurred, the duration of each device engagement (e.g., the time spent on each web application), the port number (e.g., port 80) used during each device engagement, the IP address of each computing or communicating device that accessed, interacted with, or contacted the computing resource, the amount of data (e.g., in bytes, kilobytes, megabytes, etc.) transferred during each device engagement, and the like. The DE determiner 275 can process the device engagement data and, based on analysis of the device engagement data, determine a computing resource utilization adjustment (CRUA) matrix (Step 640).

As noted earlier, FIG. 4 shows an example of a CRUA matrix 400 that can be generated by the DE determiner 275 (Step 640). The CRUA matrix 400 includes the two-dimensional 3×3 matrix populated with criticality adjustment CA values 0, 0, 0, 1, 1, 0, 1, 1, 1.

$$CRUA = \begin{vmatrix} 0 & 0 & 0 \\ 1 & 1 & 0 \\ 1 & 1 & 1 \end{vmatrix}$$

As seen in FIG. 4, the criticality adjustment CA values are segmented into three separate percentile groups, including a top percentile group (e.g., 80% to 100%), a middle percentile group (e.g., 60% to 80%) and a lowest percentile group (e.g., 0% to 60%). For each of the percentile groups, the criticality adjustment CA values are segmented into three severity levels, including HIGH, MEDIUM, and LOW. The HIGH, MEDIUM, and LOW severity levels include criticality adjustment CA values to be applied to those vulnerabilities in the VSM 300 (shown in FIG. 3) that are determined to be high-severity, medium-severity, and low-severity vulnerabilities, respectively. The DE determiner 275 can apply the CRUA matrix 400 (shown in FIG. 4) to the data in the VSM 300 (shown in FIG. 3) and generate the utilization adjustment vulnerability summary matrix UAVSM (Step 650). The vulnerabilities can be prioritized for review or remediation based on the UAVSM (Step 660).

Referring to the examples in FIGS. 3-5, the DE determiner 275 (shown in FIG. 2) can, for example, analyze each of the 56,852 vulnerabilities (3,435 high-severity vulnerabilities+50,408 medium-severity vulnerabilities+3,009 low-severity vulnerabilities=56,852 total DEFINITIVE vulnerabilities) in the DEFINITIVE column in the VSM 300 (shown in FIG. 3) and apply the CRUA matrix 400 (shown in FIG. 4) to each of the vulnerabilities to generate the UAVSM matrix 500 (shown in FIG. 5) (Step 650). For instance, the DE determiner 275 can apply a criticality adjustment CA value "0" to the 3,435 vulnerabilities that are in the DEFINITIVE-HIGH field in the VSM 300 (shown in FIG. 3) and a criticality adjustment CA value "1" to the 1,036 vulnerabilities that are in the DEFINITIVE-MEDIUM field in the VSM 300 (shown in FIG. 3) and that are in computing resources determined to have a device engagement value that is in the top percentile (80%-100%). The DE determiner 275 can populate the (80%-100%)-HIGH field in the UAVSM 500 with the number of vulnerabilities (3,435+1,061=4,471) determined to be DEFINITIVE-HIGH and belonging to computing resources that are in the top percentile of device engagement. The remaining fields in the UAVSM 500 can be similarly determined by applying the CRUA matrix 400 to the vulnerabilities in the DEFINITIVE-MEDIUM and DEFINITIVE-LOW fields to determine the vulnerability values shown in the UAVSM 500, in FIG. 5.

As seen in FIGS. 3-5, vulnerabilities in computing resources that experience higher levels of device engagement, such as, for example, device engagements that are determined to be in the highest percentile of device engagements (e.g., 80% to 100%), can have their severity levels adjusted upward by associated criticality adjustment CA values (e.g., by adding a "0", "1" or "2") to accurately represent the criticality of the vulnerabilities in the user environment. For instance, if a vulnerability is determined to have a medium-severity level (MEDIUM) and the associated computing resource is determined to be in the highest percentile of device engagements (e.g., above 80%), then the severity level can be adjusted by the criticality adjustment CA value to increase the severity level up from MEDIUM to HIGH. Each vulnerability can be adjusted upward or left unchanged, depending on the criticality adjustment CA value for the vulnerability, so that medium-severity and low-severity vulnerabilities can be prioritized to high-severity and medium-severity levels, respectively. It is noted that the criticality adjustment CA can have a negative value so as to adjust a severity level downward for vulnerabilities that are associated with computing resources having low or the lowest percentile device engagement.

After the vulnerabilities in the VSM 300 (shown in FIG. 3) have been reclassified and reprioritized (Step 660), the vulnerabilities can be reviewed or remediated by the vulnerability remediator 280, or forwarded to the client device 142 (shown in FIG. 1) for review or remediation (Step 670). The remediation can include applying one or more patches or fixes to the source code associated with the vulnerability to resolve the vulnerability.

The terms "a," "an," and "the," as used in this disclosure, means "one or more," unless expressly specified otherwise.

The term "client device," as used in this disclosure, means a computer or a communicating device that is configured to operate in the network system 100, including transmitting data and instructions signals over one or more communication links.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means software, a software application, a web application, a web page, a computer application, a computer program, computer code, machine executable instructions, firmware, a record, a file, or the like.

The term "computer readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The term "device engagement," as used in this disclosure, means any access, interaction, engagement or contact of or with a computing resource by another computing resource, computing device, or communicating device.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

The term "user environment," as used in this disclosure, means a network, an enterprise network, a public network, a private network, or any configuration that includes two or more computing devices. The user environment can include the network system 100 (shown in FIG. 1), or a subsystem of the network system 100, such as, for example, the network 135 (shown in FIG. 1).

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for remediating a cyberattack risk for a web application, the method comprising:
   receiving device engagement data for the web application;
   receiving a security scanning analysis from a static application security testing (SAST) tool that includes
      a security flaw found in the web application and a severity level for the security flaw, and
      a plurality of other security flaws found in one or more other web applications and severity levels associated with each of the plurality of other security flaws;
   determining a pro rata device engagement value for each of said web application and said one or more other web applications;
   determining a plurality of criticality adjustment values for the security flaw and each of the plurality of other security flaws based on said pro rata device engagement values for each of said web application and said one or more other web applications;
   applying a criticality adjustment value to the security flaw to modify a severity level for the security flaw;
   prioritizing the security flaw and the plurality of other security flaws based on the modified severity level to generate prioritized security flaw action items; and
   mitigating the cyberattack risk for the web application according to the prioritized security flaw action items.

2. The method in claim 1, further comprising:
   determining the pro rata device engagement value for said web application by dividing a device engagement value for said web application by a sum of device engagement values for said one or more other web applications; and
   applying a criticality adjustment value to each of the plurality of other security flaws.

3. The method in claim 1, wherein the mitigating the cyberattack risk for the web application comprises transmitting the security flaw and the security scanning analysis to a client device for review or remediation.

4. The method in claim 1, wherein the device engagement data is received from a Security Information and Event Management (SIEM) system.

5. The method in claim 1, wherein the device engagement data is received from a webserver log.

6. The method in claim 1, wherein security scanning analysis includes a security vulnerability matrix comprising a plurality of severity levels.

7. The method in claim 6, wherein the plurality of severity levels include a high-severity level and a low-severity level.

8. The method in claim 7, wherein the plurality of severity levels further include a medium-severity level.

9. The method in claim 1, wherein the severity level for the security flaw includes a medium-severity level that is modified by the criticality adjustment value to a high-severity level based on the device engagement data for the web application.

10. The method in claim 1, wherein the severity level for the security flaw includes a low-severity level that is modified by the criticality adjustment value to a medium-severity level based on the device engagement data for the web application.

11. The method in claim 1, wherein the severity level for the security flaw includes a low-severity level that is modified by the criticality adjustment value to a high-severity level based on the device engagement data for the web application.

12. A non-transitory computer readable medium having stored thereon instructions for remediating a cyberattack risk for a web application comprising machine executable code which, when executed by at least one computing device, causes the at least one computing device to perform steps comprising:
   receiving device engagement data for the web application;
   receiving a security scanning analysis from a static application security testing (SAST) tool that includes a security flaw found in the web application and a severity level for the security flaw, and a plurality of other security flaws found in one or more other web applications and severity levels associated with each of the plurality of other security flaws;
   determining a pro rata device engagement value for each of said web application and said one or more other web applications;
   determining criticality adjustment values for the security flaw and each of the plurality of other security flaws based on said pro rata device engagement values for each of said web application and said one or more other web applications;
   applying a criticality adjustment value to the security flaw to modify a severity level for the security flaw;
   prioritizing the security flaw and the plurality of other security flaws based on the modified severity level to generate prioritized security flaw action items; and
   mitigating the cyberattack risk for the web application according to the prioritized security flaw action items.

13. The non-transitory computer readable medium in claim 12, wherein the mitigating the cyberattack risk for the web application comprises transmitting the security flaw and the security scanning analysis to a client device for review or remediation.

14. The non-transitory computer readable medium in claim 12, wherein receiving device engagement data for the web application comprises receiving device engagement data from a Security Information and Event Management (SIEM) system or a webserver log.

15. The non-transitory computer readable medium in claim 12, wherein security scanning analysis includes a security vulnerability matrix comprising a plurality of severity levels.

16. The non-transitory computer readable medium in claim 15, wherein the plurality of severity levels include a high-severity level and a low-severity level.

17. The non-transitory computer readable medium in claim 16, wherein the plurality of severity levels further include a medium-severity level.

18. The non-transitory computer readable medium in claim 12, wherein applying the criticality adjustment value to the security flaw to modify a severity level for the security flaw comprises:
    modifying a medium-severity level by the criticality adjustment value to generate a high-severity level based on the device engagement data for the web application; or
    modifying a low-severity level by the criticality adjustment value to generate a medium-severity level or a high-severity level based on the device engagement data for the web application.

19. The non-transitory computer readable medium in claim 12, wherein applying the criticality adjustment value to the security flaw to modify a severity level for the security flaw comprises:
    applying a utilization adjustment vulnerability summary matrix.

20. A cyberattack risk remediation system for remediating a security flaw in a web application, the system comprising:
    a vulnerability determiner that receives a security scanning analysis from a static application security testing (SAST) tool that includes a security flaw found in the web application and a severity level for the security flaw, and a plurality of other security flaws found in one or more other web applications and severity levels associated with each of the plurality of other security flaws;
    a device engagement determiner that
        receives device engagement data for the web application,
        determines a pro rata device engagement value for each of said web application and said one or more other web applications,
        determines a plurality of criticality adjustment values for the security flaw and each of the plurality of other security flaws based on said pro rata device engagement values for each of said web application and said one or more other web applications,
        applies one of the plurality of criticality adjustment values to the security flaw to modify a severity level for the security flaw, and
        prioritizes the security flaw and the plurality of other security flaws based on the modified severity level to generate prioritized security flaw action items; and
    a remediation determiner that mitigates the security flaw in the web application according to the prioritized security flaw action items.

* * * * *